June 8, 1926.
F. SCHAEFER
BRAKE HANGER SUPPORT
Filed Dec. 19, 1924
1,588,191
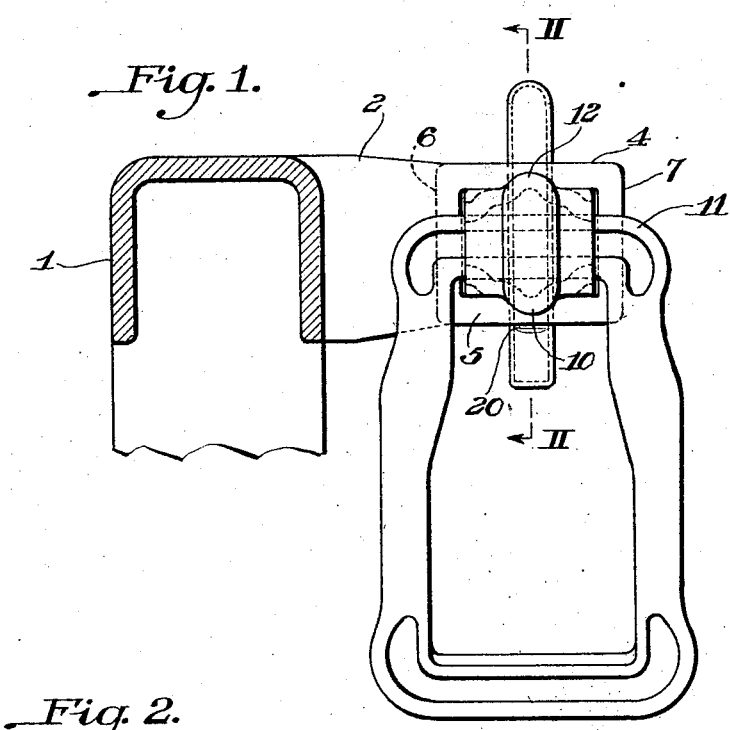
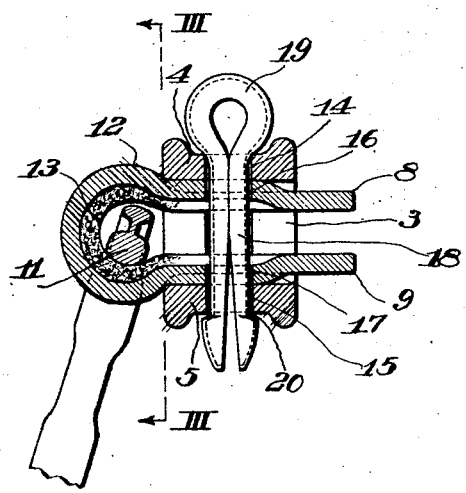
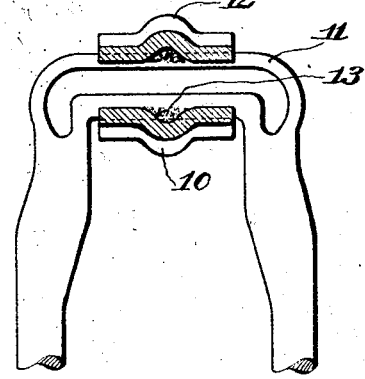
WITNESSES
A.B. Wallace
INVENTOR
Frederic Schaefer
by Winter, Brown & Critchlow
his attorneys.

Patented June 8, 1926.

1,588,191

UNITED STATES PATENT OFFICE.

FREDERIC SCHAEFER, OF PITTSBURGH, PENNSYLVANIA.

BRAKE-HANGER SUPPORT.

Application filed December 19, 1924, Serial No. 756,926, and in Canada June 5, 1924.

This application is a continuation in part of my copending application Serial No. 637,705, filed May 9, 1923.

The invention relates to brakes for railway cars, and has particularly to do with the attachment of brake hangers to truck frames.

The object of the invention is to provide means whereby a brake hanger, particularly one of the closed-link type, may be quickly and securely attached to a truck frame, and easily detached from it.

The invention is illustrated in the accompanying drawings, of which Fig. 1 is a face view of a brake hanger suspended from a truck side frame; Fig. 2 a sectional view taken on the line II—II, Fig. 1; and Fig. 3 a sectional view taken on the line III—III, Fig. 2.

In the practice of the invention a railway car truck frame is provided with a horizontally-disposed opening adapted to receive the ends of a stirrup which is shaped at its base or closed end to form a bearing for the upper yoke of a brake hanger, whether such yoke is formed of a separate pin or is an integral part of a closed-link brake hanger. The ends of the stirrup and the horizontal walls forming the stirrup-receiving opening are provided with registering vertically-disposed openings to receive a pin for connecting the stirrup and its supported brake hanger to the truck frame.

In the illustrative embodiment of the invention a truck frame 1 is shown as being provided with a laterally extending bracket 2 formed integrally with the frame and provided with a horizontally-disposed opening 3 formed by horizontal walls 4 and 5 and vertical walls 6 and 7. A stirrup, preferably of U-shape, has its ends or legs 8 and 9 arranged in opening 3. The base 10 of the stirrup is of semi-cylindrical shape to form a bearing for an upper yoke 11 of a brake hanger, and may be provided with an outwardly extending projection 12 adapted to bear against one or both horizontal walls 4 and 5 to limit the inward movement of the stirrup. Preferably the stirrup is formed of a plate bent to the shape already explained, and the projection 12 is formed by an outwardly extending medial rib which affords an interior groove adapted to receive a body of graphite 13 or other lubricant for the bearing.

As previously indicated, the horizontal walls 4 and 5 and the ends of the stirrup are provided with registering openings to receive a connecting pin. Walls 4 and 5 are shown as being provided, respectively, with openings 14 and 15 and stirrup legs 8 and 9 with openings 16 and 17. Through these registering openings a pin 18 is inserted to hold the stirrup in position. While the connecting pin may be variously constructed, it is preferably a cotter pin formed of a pressed plate or bar having a head 19 at its upper end and lateral projections 20 at its lower end to hold the pin in position. The metal of which the pin is formed is sufficiently resilient to cause the lower ends of the pin to be held yieldingly outwardly beneath the lower face of wall 5. Other pins or types of cotter pins may of course be used if desired.

The attachment of a brake hanger to a truck frame according to this invention may be effected either before or after the hanger has been attached to a brake shoe and beam. Sometimes it is necessary to attach brake hangers to the shoes and beam before the hangers are attached to truck frames, and in such cases the improved connection is particularly convenient. In connecting a brake hanger to a frame, it is only necessary to place a stirrup around the upper yoke of the hanger, insert the ends of the stirrup in the opening of the frame bracket, and drive or otherwise place a connecting pin downwardly through the several registering vertical openings to firmly connect the stirrup to the frame. The removal of a brake hanger is effected with equal ease by merely pressing together the lower ends of the connecting pin, removing it, and then withdrawing the stirrup.

According to the provisions of the patent statutes, I have described the principle and operation of my invention together with the constructions which I now consider to represent the best embodiment of it. However, I desire to have it understood that, within the scope of the appended claims, the invention may be practiced by other forms of construction than those particularly illustrated and described.

I claim:

1. In a brake for railway cars, the combination of a truck frame provided with an opening, an attaching member provided with a bearing for a brake hanger and having an end in said opening, and a pin connecting said member with said frame.

2. In a brake for railway cars, the combination of a truck frame provided with a horizontally-disposed opening, an attaching member provided at one end with a bearing for a brake hanger and having its other end in said opening, and a pin connecting said member with said frame.

3. In a brake for railway cars, the combination of a truck frame provided with a horizontally-disposed opening, a brake hanger bearing stirrup having its ends in said opening, and a pin extending through said member and frame for attaching the former to the latter.

4. In a brake for railway cars, the combination of a truck frame provided with a horizontally-disposed opening, a brake hanger bearing stirrup having its ends in said opening, the horizontal walls forming said opening and the ends of said stirrup being provided with registering vertical openings, and a pin extending vertically through said vertical openings to connect the stirrup to the frame.

In testimony whereof, I sign my name.

FREDERIC SCHAEFER